United States Patent

[11] 3,552,560

| [72] | Inventors | Momir Babunovic<br>Des Peres;<br>James R. Gender, Kirkwood, Mo. |
|---|---|---|
| [21] | Appl. No. | 803,212 |
| [22] | Filed | Feb. 28, 1969 |
| [45] | Patented | Jan. 5, 1971 |
| [73] | Assignee | Barry-Wehmiller Company<br>St. Louis, Mo.<br>a corporation of Missouri |

[54] CONTAINER EJECTION SYSTEM AND APPARATUS THEREFOR
9 Claims, 10 Drawing Figs.

| [52] | U.S. Cl. | 209/73, 209/74, 209/75 |
|---|---|---|
| [51] | Int. Cl. | B07c 3/02 |
| [50] | Field of Search | 209/73, 74, 75 |

[56] References Cited
UNITED STATES PATENTS

| 2,355,715 | 8/1944 | Edington | 209/73X |
| 2,407,062 | 9/1946 | Darrah | 209/75X |

*Primary Examiner*—Richard A. Schacher
*Attorney*—Gravely, Lieder & Woodruff

ABSTRACT: A system for handling containers while moving at high speeds in which there is provided apparatus for inspecting the containers for any of several characteristics which would require the rejection thereof as not suitable for processing, and apparatus cooperating with the inspection devices for removing the rejected containers from the stream of containers which pass one or more inspection stations. The apparatus includes means for creating a high speed series of container supports within the normal path of container motion and means by which the supports are selectively removed from the container path of normal travel so a rejected container can be dropped from the path for any reason and caused to move in a different path suitable for visual inspection.

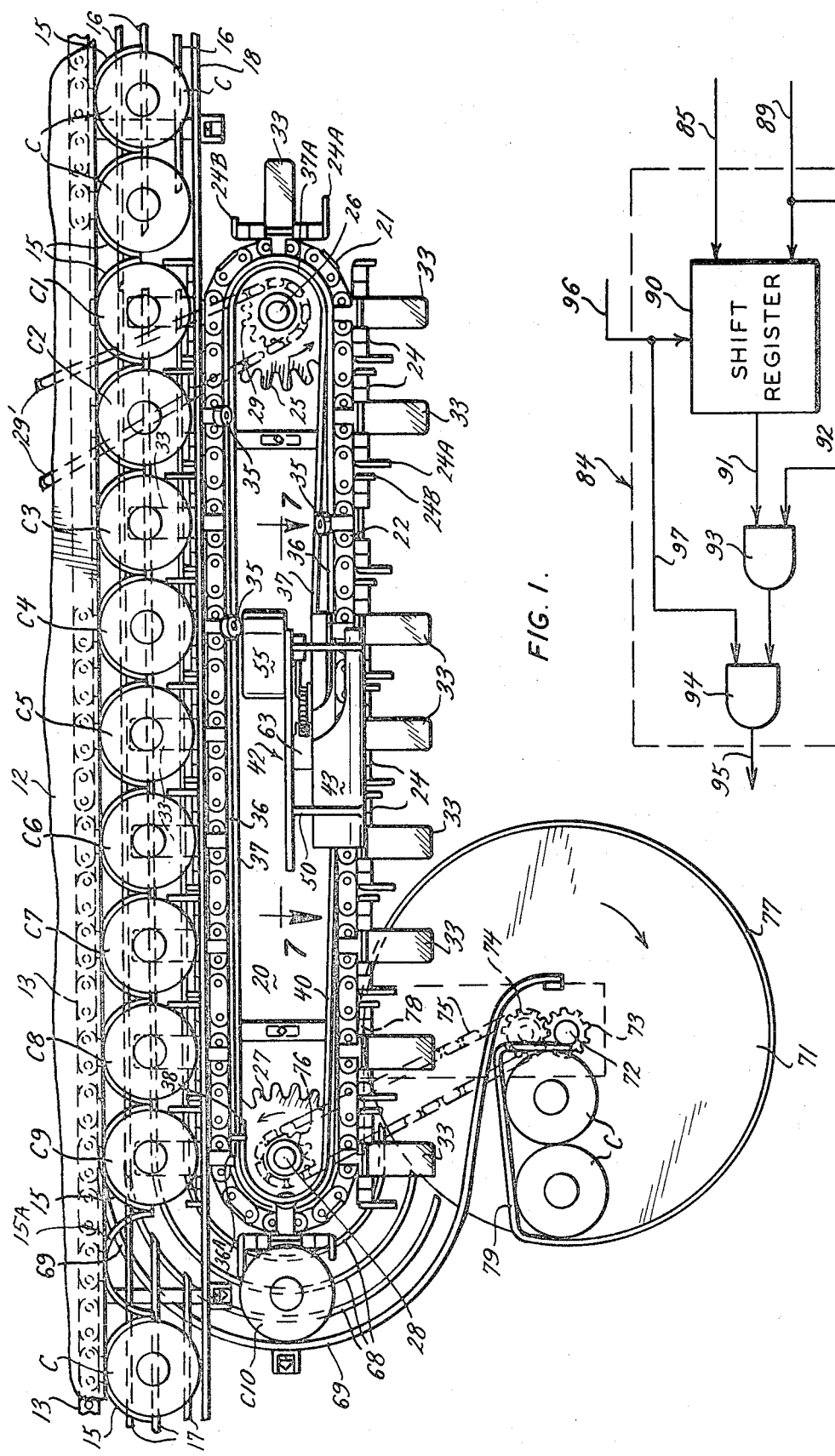
FIG. I.
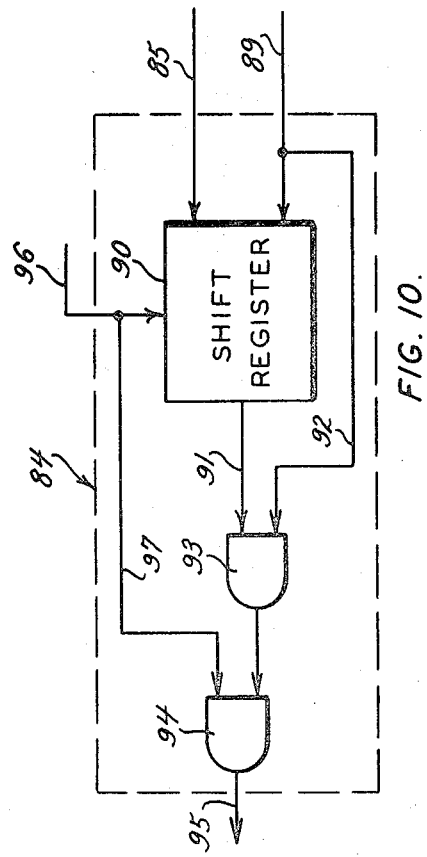
FIG. 10.

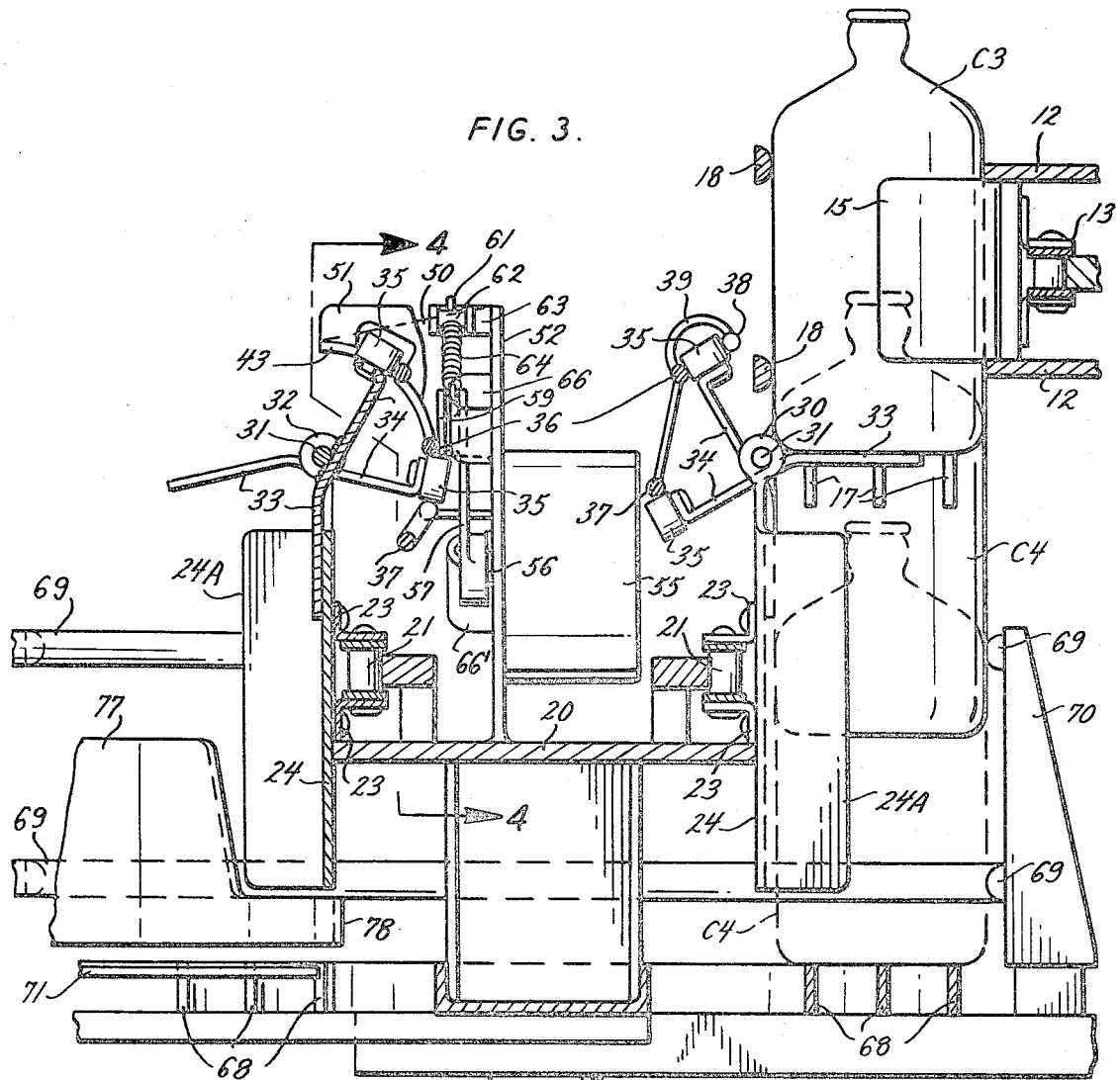
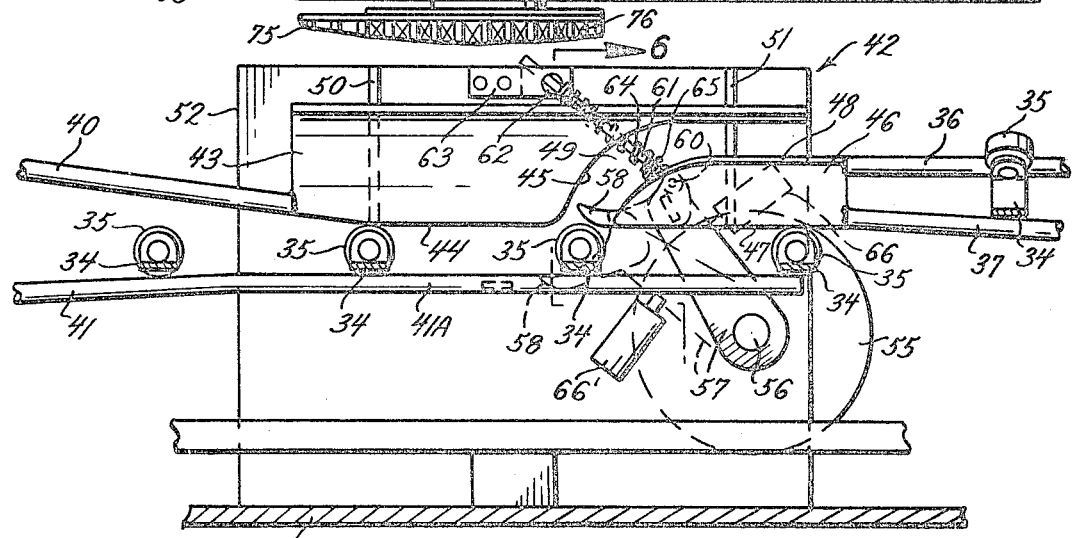

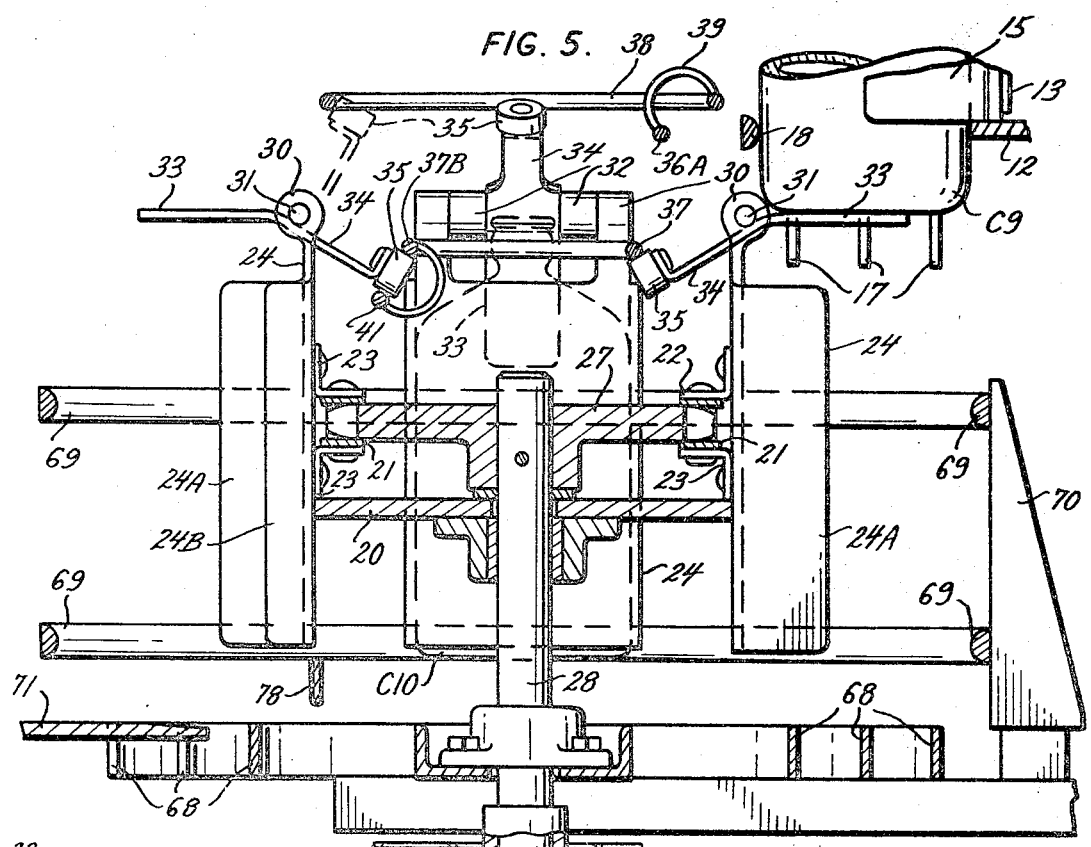
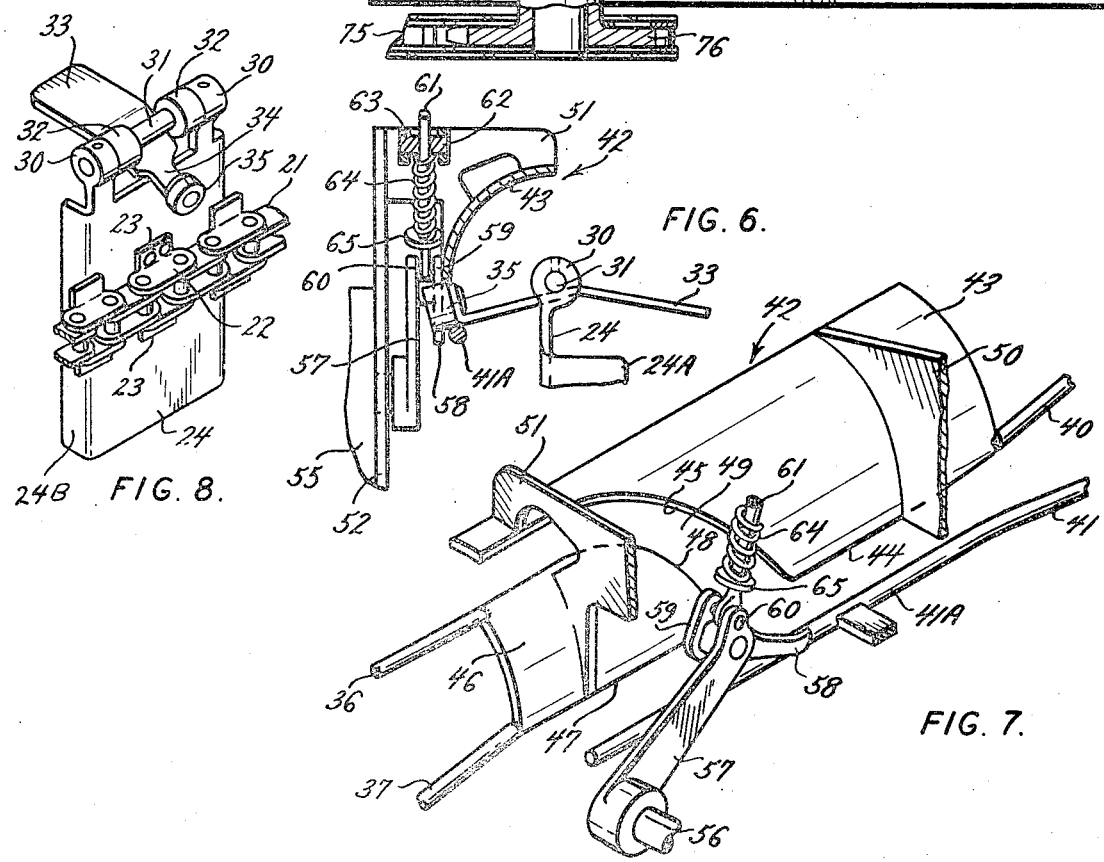

3,552,560

CONTAINER EJECTION SYSTEM AND APPARATUS THEREFOR

This invention relates to a system and apparatus for conveying containers at high speed through one or more inspection stations where undesired characteristics may be detected, and for removing the undesired containers from the conveyed stream. The apparatus of the preferred system operates to remove a rejected container without stopping the conveyor or causing a jam, and without damage to containers of a frangible type.

BACKGROUND OF THE INVENTION

Systems and apparatus for handling containers at high speed require positive means for removing rejected containers so that there will be no need to stop the movement of the stream of containers and then resume the movement. Frangible containers cannot be stopped and started without running the risk of breakage, and the power consumption required to build up speed after stoppage is costly. It is, furthermore, a characteristic of many inspection devices that its detection sensitivity needs to be adjusted so that a certain percentage of perfectly good containers will be rejected in order to be certain of detecting all undesired or contaminated containers. Thus, a passable container may be rejected because of heavy embossed lettering or the presence of foam from the use of lubricants on the conveyor, or for other reasons usually encountered in container handling and inspection systems.

BRIEF SUMMARY OF THE INVENTION

The system of this invention includes apparatus for conveying a stream of containers past one or more stations where a predetermined inspection is made while the containers are in motion, and for continuing the stream flow through a rejection station. The stream flow past the inspection stations requires positive support of the containers whereas in the rejection station the support becomes selective so that rejection can be accomplished by removing the support for only those containers to be rejected.

The apparatus is arranged so that an inspection device senses the undesired characteristic of a container and generates a signal that is transmitted to the selective support means to remove such support at a particular place in the reject station. At the reject station the container is free to fall by gravity onto an auxiliary conveyor which moves the rejected container to a receiving table where it may be manually inspected as a check on the reasons for its rejection.

Containers may be inspected by several devices, each of which is preset to detect for a given condition that is undesired. The devices are arranged in series along the path of container movement, and means is incorporated for collecting the reject data and for timing the transmission of an active reject signal to the rejection station where removal takes place.

More particularly, this invention is directed to a system for inspecting a stream of containers and selectively rejecting undesired containers from the stream comprising conveying a stream of containers along a predetermined path, dividing the path into two spaced fixed portions, continuously bridging the space between the spaced fixed portions by inserting a series of individually movable container supports into the space between the two fixed portions, inspecting the containers at a station upstream from the insertion of the series of movable container supports, generating reject signals at the inspection station, applying the reject signal to predetermined ones of the individual container supports to remove the associated support from the continuously moving series of supports, and receiving the rejected containers in a second conveyor path.

BRIEF DESCRIPTION OF THE DRAWINGS

The preferred apparatus for practicing the principals of this invention is illustrated in the accompanying drawings wherein:

FIG. 1 is a plan view of only so much of the conveyor system and its cooperating rejection station apparatus as will afford a clear understanding of certain preferred structure by which the rejection of undesired containers can be accomplished;

FIG. 3 is a greatly enlarged and fragmentary sectional view of the apparatus taken at line 3–3 in FIG. 2;

FIG. 4 is a fragmentary elevational view taken at line 4–4 in FIG. 3;

FIG. 5 is another fragmentary sectional view at line 5–5 in FIG. 2;

FIG. 6 is a fragmentary sectional view taken at line 6–6 of FIG. 4;

FIG. 7 is a fragmentary perspective view of the preferred switching means employed in the reject station to condition the apparatus for selecting a container for rejection, the view being taken at line 7–7 in FIG. 1;

FIG. 8 is a perspective view of a typical assembly of container support means incorporated in the apparatus constituting the rejection station;

FIG. 10 is a block diagram of the shift register and responsive Nand gate means therefor.

DESCRIPTION OF THE APPARATUS

Figure 2:
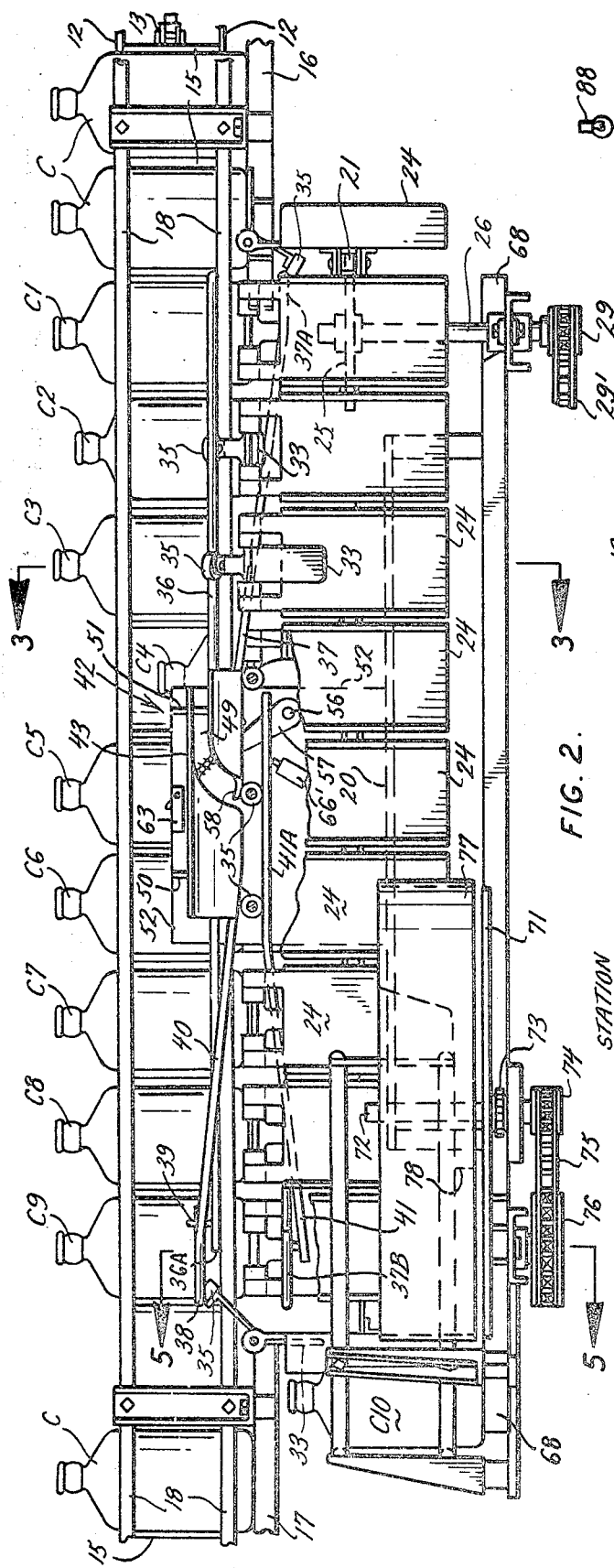
FIG. 2 is an elevation view of the apparatus of FIG. 1, but with certain portions of the structure broken away for a better understanding of its components.

In FIG. 1 the flow stream for the containers C is composed of a suitable elongated guide structure 12 fixed in position to support a conveyor chain assembly 13 provided with pockets 15 for propelling the containers in spaced relation over a support structure made up of grid bars 16 leading into the reject station and other grid bars 17 leading away from the reject station. The containers C are retained in the conveyor pockets by a suitable fence structure 18 which is continuous through the reject station.

The reject station is disposed between the ends of grid bars 16 and 17 and is directed parallel to the conveyor chain assembly 13. An elongated rigid frame 20 located horizontally at one side of the conveyor chain 13 (FIG. 1 and 3) supports an endless chain conveyor 21 in which certain links 22 (FIG. 8) have brackets 23 by which a container pocket 24 is mounted in an upright attitude as it is propelled about the periphery of the frame 20. The drive for the conveyor 25 comes through a drive sprocket 25 (FIG. 1) on shaft 26 and a driven sprocket 27 on shaft 28. Power input is derived from a chain 29' engaged on sprocket 29 fast on shaft 26 (FIG. 2).

The conveyor pockets 24 have a container propelling flange 24A which is wider than the leading flange 24B FIGS. 1, 5 and 8). At the top of each pocket 24 there are provided hinge ears 30 to support a pin 31 in a horizontal position. The pin 31 hingedly engages the pivot ears 32 on a container supporting flap 33 which projects to the container side of the pocket. The flap 33 is formed with a control arm 34 on which a roller 35 is mounted. Each pocket 24 is the same, and as shown in FIGS. 3, 5 and 8, the flaps 33 may be swung from container-supporting positions projecting horizontally above each pocket to a folded position lying against the back of the pocket so as to be out of the way for the vertical drop of a container into a position between the propelling flange 24A and the leading flange 24B.

Positive control over the position of each pocket flap 33 is obtained by track means which begins (FIGS. 1, 2 and 4) at upper rail 36 and lower rail 37. The upper rail 36 (FIG. 2) extends around the path of the conveyor pockets 24 at the sprocket 25 and the lower rail 37 follows the same path. These rails extend along the path of conveyor 13 (FIG. 3) toward the opposite sprocket 27. Adjacent sprocket 27 (FIGS. 1, 2 and 5) the upper rail 36 terminates at 36A and a second upper switch rail 38 begins. The switch rail 38 is held by a suitable bracket 39 at a higher elevation than rail end 36A so the roller 35 will be switched from the top of rail end 36A to the under side of rail 38. Rail 38 loops about the conveyor end portion and continues along a declining section 40. The bottom rail 37 starts out (FIG. 2) on a declining path until it levels out at the loop 37A adjacent sprocket 25. It remains substantially level adjacent conveyor 13 and loops about the position of sprocket 27 where it terminates at end 37B. An upwardly inclined rail 41 begins adjacent rail end 37B and converges with rail 40.

The endings of rails 40 and 41 are spaced (FIG. 2) from the beginnings of rails 36 and 37 for the insertion of a switching device shown at 42 (FIGS. 1, 2, 3,4, 6 and 7). The switching device 42 includes a curved plate 43 having a lead-in margin 44 and a curved cam margin 45. The plate 43 has a spaced portion 46 with a margin 47 aligned with margin 44 and a cam margin 48 spaced from the curved cam margin 45 to provide a switch slot 49. The aligned spaced margins 44 and 47 of the plates 43 and 46 are spaced from a terminal portion 41A of the bottom rail 41. The plate 43 is supported by brackets 50 and 51 from a supporting wall 52 carried by the frame 20. The bracket 51 also supports the spaced cam plate portion 46. As is seen in FIGS. 3 and 6, the cam plates 43 and 46 are curved to the arc of swing of the arms 34 carrying rollers 35.

THE REJECT SWITCHING DEVICE

In order to determine whether the container flaps 33 are held in horizontally erect positions to support and carry containers C from the grid bars 16 (FIGS. 1 and 2) to the spaced grid bars 17, the flap control rollers 35 must be switched between riding the top of the upper rail 36 and following the underside of the bottom rail 37. The flaps 33 will be held in supporting positions when the rollers 35 are following under the rail 37 and will be folded into nonsupporting position when the rollers 35 ride the top rail 36. Switching device 42 accomplishes this function through the operation of a rotary motor means 55 mounted on the rear side of wall 52 so its shaft 56 (FIGS. 3, 4, 6 and 7) projects through wall 52 to actuate an arm 57 on which a switch finger 58 is mounted. The finger 58 normally assumes the raised full line position in FIG. 4 so it blocks the entrance to the cam slot 49, but it can be moved to the lowered dotted line position by actuation of arm 57 in a counterclockwise direction. The arm 57 is provided adjacent finger 58 with a bracket 59 to carry the finger 58 and to receive a pivot pin 60 for attaching the eye of a toggle arm 61. The outer end of the toggle arm 61 is slidably mounted in a pivoted guide 62 supported by bracket 63 fixed on wall 52. A suitable toggle spring 64 has one end bearing on a thrust shoulder 65 fixed at the eye of toggle arm 61, and its opposite end bears on the pivoted guide 62.

The pin 60 in the eye of the toggle arm 61 (FIG. 4) is normally held by spring 64 above the imaginary line running through the axis of shaft 56 and the axis of the pivoted guide 62. Thus, the finger 58 is held raised to block the entrance to cam slot 49 so the rollers 35 will be held against the rail end 41A. Energization of motor means 55 causes the arm 57 to swing counterclockwise to its dotted line position which is past dead center for the toggle arm 61. The spring 64 now holds the finger 58 down to force the rollers 35 to ride upwardly into camslot 49.

The motion of the arm 57 must be very rapid in both directions of movement, and such movement must be positive, accurate and free of bounce that could result in reversal of movement. A first dash pot device 66 is engaged by the arm 57 when raised to act both as a stop and to check rebound. A second dash pot 66′ performs the same function to stop arm 57 when moved to its switch position and to check rebound. The dash pots 66 and 66′ are mounted on wall 52 (FIG. 3).

MECHANICAL OPERATION OF THE APPARATUS

Reference will be made to FIGS. 1, 2, 3 and 4 in the following description, and to other views where appropriate. In FIG. 1 the stream of containers C arriving in the high speed conveyor pockets 15 from the right-hand side pass the reject conveyor assembly represented by the conveyor pockets 24. Containers C to be passed through to the exit at grid bars 17 must be supported between the end of grid bars 16 and the beginning of grid bars 17. Container support, seen in FIG. 3, is obtained when the flap 33 for each pocket 24 is held in extended horizontal position. When the flap 33 for any pocket 24 is vertically positioned the container from conveyor pocket 15 will be free to drop by gravity to the lower supporting grid bars 68 (FIG. 3). During the drop to the grid bars 68 the container will be registered with a pocket 24 having its flap 33 folded, and a suitable guide fence consisting of bars 69 supported on brackets 70 retain the containers in position. The container on the lower set of grid bars 68 is carried about the end sprocket 27 (FIGS. 1 and 5) in a circular path to a reject collecting rotary table 71 mounted on a vertical shaft 72. The shaft 72 is driven by meshing gears 73 and 74, with the shaft for gear 74 driven by a sprocket chain 75 from shaft 28 and sprocket 76 (FIGS. 1, 2 and 3).

The rotary table 71 is provided with a stationary fence 77 which circles the table 71 from the entrance end 78 to a stop portion 79 directed chordally of the table and spaced from the entrance end 78. Gears 73 and 74 are provided to reverse the direction of rotation of shaft 72 relative to its driving shaft 28.

It can be seen in FIG. 1 that, beginning at the right side, containers C1, C3, C5, C6, C7, C8 and C9 are supported by flaps 33. However, containers C2 and C4 are not supported by the flaps and, therefore, are in the act of dropping by gravity out of conveyor pockets 15 and into registered pockets 24. Two different positions of the drop of container C4 can be seen best in FIG. 3 in relation to container C3. It is also seen in FIG. 1 that container C10 at the left has fallen from its now empty pocket 15A and is being propelled by the pocket flange 24A on the curved grid bars 68 toward the rotary table 71. As noted in FIG. 2 at the left side, a gap is present in the line of containers due to the rejection of container C10, and it is also seen that containers C2 and C4 are in the act of dropping out of the conveyor 13.

The removal of the supporting flap 33 for container C2 is achieved by causing its control roller 35 to ride on top of the upper rail 36 from the switching device 42 on around the sprocket 25 and along the straight rail running parallel with conveyor 13. The same action obtains for container C4 and for container C10.

In FIGS. 2 and 4 it can be seen that the switching finger 58 of the device 42 is raised to block the cam slot 49. Therefore, the series of rollers 35 carried along the bottom edge 44 of the cam plate 43 will follow the rail 41A and pass the cam slot 49 to continue under cam edge 47 and ride on the underside of bottom rail 37. The downward slope of the beginning portion of rail 37 causes the flaps 33 connected to such rollers 35 to swing into horizontal container supporting positions. Each such flap 33 will retain that horizontal position (FIG. 3) throughout the length of rail 37 and until the roller runs off the terminal end 37B (FIG. 2). At such latter time, the roller will transfer its contact to the upwardly inclined portion of rail 41 which feeds the roller again under the edge 44 of cam plate 43.

When, however, the switching device 42 is actuated to move the finger 58 down to open cam slot 49, the next roller 35 will be caused to enter the slot 49 and move out on top of the upper rail 36. Now the roller 35 riding on the top rail 36 will pivot its flap 33 into a vertically pendent position (FIGS. 2 and 3) to positively withdraw the flap from container-supporting position. The roller 35 will continue on rail 36 until it rides off the terminal end 36A and passes under the rail 38, whereupon the roller will follow the downwardly inclined rail 40 to again ride under the edge 44 of the cam plate 43.

A container, such as container C10, once rejected will drop to the auxiliary conveyor and be carried onto rotary table 71. Once on the table 71 it can be manually removed for closer inspection to confirm the reasons for its rejection.

THE REJECT SYSTEM

Figure 9:
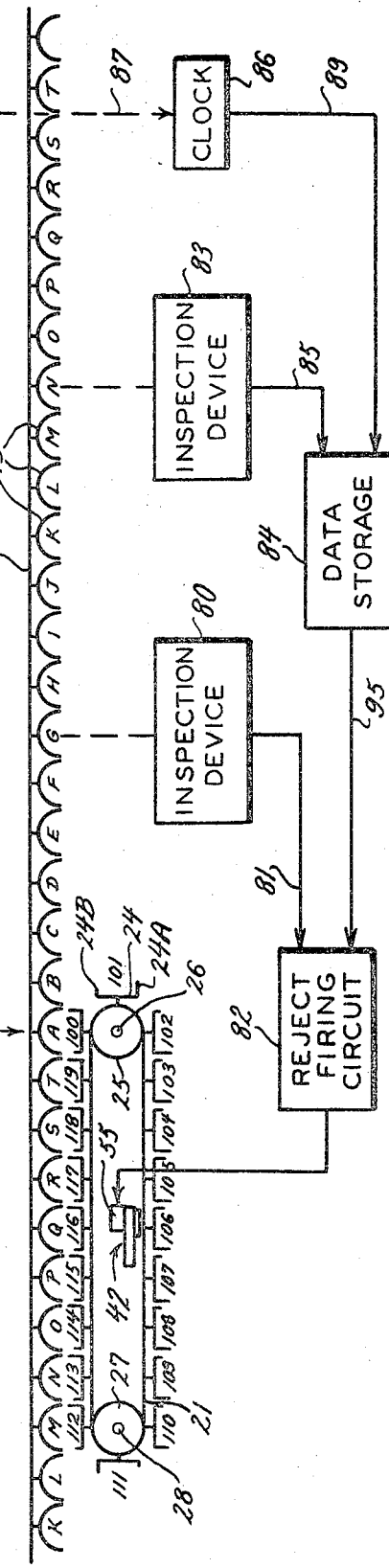
FIG. 9 is a schematic plan view of the system for arranging the inspection devices in series along the container flow stream in advance of the reject station, and includes a block diagram of the sensing circuit.

Turning now to FIGS. 9 and 10, there has been shown a schematic layout of the components provided for inspecting containers and for transmitting a reject signal to the motor means 55 in the reject device 42 (FIG. 4) so that the finger 58 may be momentarily and rapidly moved to the dotted line position for preparing the proper support flap 33 to be moved to a nonsupporting position when its pocket 24 moves around sprocket 25 (FIG. 1) to register with a conveyor pocket 15 in which the container that caused the reject signal to be generated is moved off the supporting grid bars 16.

For a better understanding of the following description the pockets 15 for the high speed conveyor 13 are successively designated by alphabetical letters A to T. The pockets 24 in the reject conveyor 21 are denominated by numerals 100 to 119. Therefore, pocket A registers with pocket 100, pocket B with pocket 101, and so on consecutively around the endless conveyor 21.

It is, of course, evident that the pockets 15 on conveyor 13 in advance of pocket A are repetitious of the alphabetical designations assigned to the pockets beginning at A and reading leftwardly.

As seen in FIG. 9, inspection of containers at the position of pocket G is performed by a suitable inspection device 80 of the character, for example, disclosed in Wyman U.S. Pat. No. 3,191,773, issued Jun. 29, 1965 and in application of James R. Gender, et al., U.S. Ser. No. 773,759, filed on Nov. 6, 1968. The location of device 80 is seven pockets upstream from the place where pocket G will register with pocket 106. Therefore, if the container in pocket G must be rejected a signal must reach the motor means 55 in time to move the switching finger 58 down so that the roller 35 for pocket 106 will be switched onto the top rail 36 (FIG. 2). When pocket 106 moves forward to register with pocket G at station X, there will be no supporting flap 33 to carry the container, and that container will drop by gravity and be rejected onto the rotary table 71.

The signal arising in inspection device 80 will be transmitted by line 81 to a reject firing circuit contained in the box 82. This action is termed direct rejection because the signal from device 80 directly acts on the switching device 42 to condition pocket 106 to receive the container from pocket G when the two pockets register at station X.

When a second inspection device 83 is disposed in the system it is placed upstream from device 80 by a preselected number of pockets. In this example, the second device 83 is placed to inspect containers at the location of pocket N which is seven pocket positions away from pocket G. The device 83 must feed its particular signal to a data storage device 84 by line 85. The data will there be stored until the correct pocket in the endless conveyor 21 reaches the reject-switching device 42. Thus, the data storage device 84 must retain the reject signal from device 83 for seven counts before releasing it to the reject-firing circuit 82. The length of time the data is stored at device 84 is determined by the number of pockets between the two inspection devices 80 and 83, and this can be any whole number of pockets.

The time measure is regulated by a clock device 86 which receives a beam of light 87 from a light source 88. The light beam is broken each time a pocket 15 passes the light source, and a suitable photocell is pulsed thereby. The clock pulse signal is fed by line 89 into the data storage device 84, and determines when the signal from device 83 must be released to energize the reject-firing circuit 82. Thus, pocket N at inspection device 83 must travel to the position of pocket G before the data storage device 84 energized the firing circuit to condition pocket 113 to drop its flap 33 so the rejected container N can drop.

The data storage device 84 is best seen in FIG. 10 and utilized digital integrated circuits of known character. For present purposes, the device 84 may use a shift register 90 of the type No. SN7491 available from Texas Instrument Co. The shift register 90 is a serial-in, serial-out unit which is composed of a series of master-slave flip-flops. When a signal appears at the input from line 85 simultaneously with a clock pulse signal from line 89, the information is entered into the first flip-flop. Successive clock pulses from line 89 cause the information from line 85 to be sequentially transferred to the following flip-flops. When the information reaches the last flip-flop it appears at the shift register output 91.

When two successive containers are to be rejected, the reject signal information will appear at the output of the shift register 90, after storage, as one continuous output signal for the duration of two containers. In order to obtain two separate reject signals from this information, the output of the shift register 90 and the clock pulse signal in line 92 are both fed to a Nand gate 93. The Nand gate 93 produces a negative output whenever it simultaneously receives positive inputs from both lines 91 and 92. A second Nand gate 94 is used to invert the output of the first Nand gate 93 and provide positive reject signals to the reject firing circuit 82 by line 95. Electrical power for the gate 93 and the shift register is supplied by line 96 and its branch 97.

The number of flip-flops in the shift register 90 is one greater than the number of pockets separating the second inspection device 83 from the first inspection device 80. As seen in FIG. 9, there are seven-pockets which requires a shift register 90 with eight flip-flops. This is termed an 8 bit shift register, but any other number of bits may be used as dictated by the spacing between the inspection devices. While two inspection devices 80 and 83 have been described, it is clear that three or more may be incorporated with proper circuit connections and components of the character associated with inspection device 83.

SUMMARY OF OPERATION

The high speed conveyor 13 (FIG. 1) propels containers C past inspection device 80 and toward an endless reject conveyor 21. During the travel in conveyor 13 the containers are first supported by grid bars 16, then by a series of moving flaps 33 in the conveyor 21 and then by the grid bars 17.

When an undesired container is detected by the device 80, a signal is sent through the reject-firing circuit 82 to the motor means 55 in the switching device 42 which drops a predetermined flap 33. The pocket 24 associated with the dropped flap 33 is moved to register with the pocket 15 propelling the container to be rejected. When the two pockets 15 and 24 register at station X (FIG. 9), the container drops by gravity into the pocket 24 and is caught by the grid bars 68. The rejected container is rapidly moved to the rotary table 71 for further visual inspection by the operator. The flap 33 that was removed from its normal-supporting position (FIG. 8) is caused to resume that position by following the lower margins 44 and 47 of the cam plates 43 and 48 respectively. If it is assumed that a rejected container on reaching station X (FIG. 9) will fall freely by gravity, and with the conveyor pockets 15 moving at a velocity equivalent to approximately 2000 containers per minute, such container will come to rest on the lower grid bars 68 within about 2 feet of horizontal travel from its release at station X.

There has been disclosed above suitable apparatus for implementing a system for inspecting a stream of containers and selectively rejecting undesired containers. The system includes the steps of conveying a stream of containers along a predetermined path, dividing the path into spaced sections, and continuously bridging the space in the predetermined path by inserting a series of individually movable container supports into the space. Container inspection means located upstream from the container supports generates a suitable signal where an undesired container is detected and a selected one of the supports is moved to a folded, nonsupporting position so the undesired container is free to move, by falling, to another conveyor path.

We claim:

1. A system for inspecting a stream of containers and selectively rejecting undesired containers from the stream comprising conveying a stream of containers along a predetermined path, dividing the path into two spaced fixed portions, continuously bridging the space between the spaced fixed portions by inserting a series of individually movable container supports into the space between the two fixed portions, inspecting the containers at a station upstream from the insertion of the series of movable container supports, generating reject signals at the inspection station, applying the reject signals to predetermined ones of the individual container supports to remove the associated support from the continuously moving series of supports, and receiving the rejected containers in a second conveyor path.

2. The system set forth in claim 1 in which the stream of containers is arranged in single file order, and the second conveyor path is below the elevation of the predetermined path and is adapted to catch rejected containers in a substantially free gravitational fall.

3. The system set forth in claim 1 in which the upstream inspection of containers senses a plurality of undesired characteristics separating the generated reject signals, and sequentially applying the reject signals to remove the predetermined ones of the individual supports.

4. In a high speed container conveyor having a predetermined path divided into spaced aligned portions and fixed container support means for each of the spaced portions, the improvement which includes: an endless conveyor having a first linear path coincident with the spaced fixed container support means and a second linear path at one side of said first path, container support means moved by said endless conveyor through each of said linear path, said support means being selectively movable between a normal container support position and a folded position out of container support position while in said first linear path, and means in said second linear path operable to predetermine the movement of each of said support means into one of said positions.

5. In apparatus for rejecting undesired containers from a flow stream of containers advanced along a predetermined path in single file order, the improvement which includes: a first conveyor having a closed path; container supporting flaps pivotally mounted on said first conveyor and movable in a closed path, said first conveyor having a first pass which forms a portion of the flow stream path and a second pass spaced from said first pass; rail means extending about the closed path of said first conveyor; position control means connected to said supporting flaps and engaged on said rail means; control means inserted in said second pass and operable to select the engagement of said control means on said rail means to locate said supporting flaps selectively in container-supporting position and in nonsupporting position; means to inspect containers for undesired characteristics, said inspection means generating a signal indicative of said undesired characteristics; signal-transmitting means operably connecting said inspection means and said control means to select said nonsupporting position of said flaps; and auxiliary conveyor means positioned in container-receiving relation to said first conveyor to receive containers failing to engage a supporting flap.

6. In container-conveying apparatus, the combination which includes: first conveyor means having a first series of container propelling pockets for individual containers; fixed support means extending below said series of pockets and divided into a feed section and a discharge section separated by a gap in which the containers are not supported; second conveyor means having a second series of container-receiving pockets for individual containers, said second conveyor pockets being movable into and out of the gap separating said feed and discharge sections of said fixed support means and at an elevation below said fixed support means; container-supporting flap means pivotally mounted on each of said second pockets and normally positioned in the gap at the elevation of said fixed support means to receive and support containers propelled by said first series of pockets through the gap; track means extending along said second conveyor means adjacent the gap in said first conveyor and having a first surface and a second surface in spaced relation; flap position control means selectively movable over said first and second track surfaces, movement of said position control means over said first track surface retaining said flap means in normal container-supporting position; switching means in said second conveyor operable to select the engagement of said flap position control means on said second track surface to remove said flap from normal container-supporting position and allow a container to fall from a pocket of said first series to a pocket of said second series; means upstream of the gap in said first conveyor to inspect containers for undesired conditions; and means connecting said inspection means and said switching means to effect removal of a selected flap from normal container-supporting position.

7. The apparatus of claim 6 wherein said upstream inspection means includes spaced units each operable according to a predetermined undesired condition.

8. The apparatus of claim 7 wherein said spaced units are disposed in series relation to the containers moved by said first conveyor.

9. The apparatus of claim 7 wherein said means connecting said spaced units and said switching means includes a signal-releasing circuit, and each said unit generates a signal for release by said releasing circuit.